US 11,212,105 B2

(12) United States Patent
Young et al.

(10) Patent No.: US 11,212,105 B2
(45) Date of Patent: Dec. 28, 2021

(54) SYSTEMS AND METHODS OF PROVIDING AND VALIDATING DIGITAL TICKETS

(71) Applicant: moovel North America, LLC, Portland, OR (US)

(72) Inventors: Brian Young, Portland, OR (US); William Derocher, Portland, OR (US); Matthew Rotter, Portland, OR (US); Zachary Babb, Portland, OR (US)

(73) Assignee: moovel North America, LLC, Portland, OR (US)

( * ) Notice: Subject to any disclaimer, the term of this patent is extended or adjusted under 35 U.S.C. 154(b) by 0 days.

(21) Appl. No.: 15/803,695

(22) Filed: Nov. 3, 2017

(65) Prior Publication Data

US 2018/0278422 A1    Sep. 27, 2018

Related U.S. Application Data

(60) Provisional application No. 62/475,828, filed on Mar. 23, 2017.

(51) Int. Cl.
*H04L 9/32*    (2006.01)
*G06Q 10/02*    (2012.01)
*H04W 4/02*    (2018.01)

(52) U.S. Cl.
CPC .......... *H04L 9/3234* (2013.01); *G06Q 10/02* (2013.01); *H04L 9/3247* (2013.01);
(Continued)

(58) Field of Classification Search
CPC ... H04L 9/3234; H04L 9/3297; H04L 9/3247; H04L 9/3263; G06Q 10/02; H04W 4/02
See application file for complete search history.

(56) References Cited

U.S. PATENT DOCUMENTS 7,093,130 B1 *  8/2006  Kobayashi .............. G06F 21/64
                                                            705/67
9,306,753 B1    4/2016  Vandervort et al.
(Continued)

OTHER PUBLICATIONS

Feng Bao, A scheme of digital ticket for personal trusted device, 2004, IEEE, 3065-3069 (Year: 2004).*
Gianluigi Me, Security overview for m-payed virtual ticketing, 2003, IEEE, 844-848 (Year: 2003).*
Chun-Te Chen et al., A mobile ticket validation by VSS tech with Time-stamp, 2004, IEEE, 1-4 (Year: 2004).*
(Continued)

*Primary Examiner* — Matthew Smithers
*Assistant Examiner* — Mirza Israr Javed
(74) *Attorney, Agent, or Firm* — Jones Day

(57) ABSTRACT

Systems and methods for providing and validating a digital ticket are disclosed. In one implementation, a ticket validating device includes one or more processors configured to obtain a digital ticket, a ticket-server signature, and a device signature from a ticket holder's device. The digital ticket is obtained from a ticket server by the ticket holder's device, the ticket-server signature is generated based on the digital ticket using a private key associated with the ticket server, and the device signature is generated based on the digital ticket using a private key associated with the ticket holder's device. The one or more processors are further configured to validate the digital ticket. The validation of the digital ticket includes verifying the ticket-server signature using a public key corresponding to the private key associated with the ticket server, and verifying the device signature using a public key corresponding to the private key associated with the ticket holder's device. Moreover, the one or more processors are further configured to cause generation of an output based on a result of the validation of the digital ticket.

17 Claims, 5 Drawing Sheets

(52) U.S. Cl.
CPC .......... *H04L 9/3263* (2013.01); *H04L 9/3297*
(2013.01); *H04W 4/02* (2013.01)

(56) References Cited

U.S. PATENT DOCUMENTS

| | | | | |
|---|---|---|---|---|
| 2003/0135458 | A1* | 7/2003 | Tadano | G06Q 30/04 705/40 |
| 2004/0002904 | A1* | 1/2004 | Deas | G06Q 30/0633 705/26.62 |
| 2005/0005114 | A1* | 1/2005 | Medvinsky | G06F 21/10 713/168 |
| 2014/0201066 | A1* | 7/2014 | Roux | G06Q 20/3227 705/39 |
| 2015/0371228 | A1* | 12/2015 | Kershaw | G06Q 20/3274 705/77 |
| 2016/0092796 | A1* | 3/2016 | Tran | G06Q 10/02 705/5 |
| 2016/0112202 | A1* | 4/2016 | Vandervort | H04L 9/3234 713/176 |
| 2017/0293908 | A1* | 10/2017 | Wadley | G07C 9/27 |

OTHER PUBLICATIONS

U. Biader Ceipidor et al., Mobile Ticketing with NFC management for transport companies. Problems and solutions. 1-6 (Year: 2013).*
Kai Fan etal, NFC secure payment and verification scheme with CS E-ticket, 2017, Hindawi, 1-9 (Year: 2017).*
Daniele Quercia, Motet: Mobile transactions using electronic tickets, 2005, IEEE, 1-10 (Year: 2005).*
Jerry Gao, A 2D barcode-based mobile payment system, 2009, IEEE, 302-329 (Year: 2009).*
Bao Guihao, The design of an RFID security protocol based on RSA signature for E-ticket, 2010, IEEE, 1-4 (Year: 2010).*
T. Suman Kumar Reddy et al., Two distributed algorithms for E-ticket validation protocols for mobile clients, 2003, IEEE, 1-8 (Year: 2003).*
Alf Zugenmaier, et al., Enhancing Applications with approved location stamps, 2001, IEEE, 140-147 (Year: 2001).*
International Search Report dated Mar. 1, 2019 for corresponding International Application No. PCT/US2018/059082.
Written Opinion dated Mar. 1, 2019 for corresponding International Application No. PCT/US2018/059082.

* cited by examiner

SYSTEMS AND METHODS OF PROVIDING AND VALIDATING DIGITAL TICKETS

TECHNICAL FIELD

The present disclosure relates to systems and methods for providing and validating digital tickets. More particularly, the present disclosure relates to computer systems and methods for providing and validating a digital ticket that are further capable of detecting and rejecting fraudulent digital tickets.

BACKGROUND

Historically, consumers show that they previously purchased a fare or a pass for transit or a right for admission to a show, performance, or an event by presenting a physical representation of that purchase, commonly referred to as a ticket. Over time, physical tickets have evolved to contain additional security features, such as holograms, QR codes, security codes, etc. Such tickets typically require an electronic validation procedure. For example, when a ticket containing an electronic security feature such as a QR code is presented, the QR code in the ticket may be read by a QR reader and validated based on the information included in the QR code.

However, conventional security features may be defeated and conventional tickets are still vulnerable to a wide range of fraud techniques. For example, a person may save the ticket with a QR code (e.g., by taking a photo of the QR code) and may reuse the ticket by presenting the reproduced ticket.

SUMMARY

Systems and methods for providing and validating a digital ticket are disclosed. In one embodiment, a ticket validating device may include one or more processors configured to obtain a digital ticket, a ticket-server signature, and a device signature from a ticket holder's device. The digital ticket may be obtained from a ticket server by the ticket holder's device, the ticket-server signature may be generated based on the digital ticket using a private key associated with the ticket server, and the device signature may be generated based on the digital ticket using a private key associated with the ticket holder's device. The one or more processors may be further configured to validate the digital ticket. The validation of the digital ticket may include verifying the ticket-server signature using a public key corresponding to the private key associated with the ticket server, and verifying the device signature using a public key corresponding to the private key associated with the ticket holder's device. Moreover, the one or more processors may be further configured to cause generation of an output based on a result of the validation of the digital ticket.

In another embodiment, a method for validating a digital ticket by a ticket validating device may include obtaining a digital ticket, a ticket-server signature, and a device signature from a ticket holder's device. The digital ticket may be obtained from a ticket server by the ticket holder's device, the ticket-server signature may be generated based on the digital ticket using a private key associated with the ticket server, and the device signature may be generated based on the digital ticket using a private key associated with the ticket holder's device. The method may be further include validating the digital ticket. The validation of the digital ticket may include verifying the ticket-server signature using a public key corresponding to the private key associated with the ticket server, and verifying the device signature using a public key corresponding to the private key associated with the ticket holder's device. Moreover, the method may further include causing generation of an output based on a result of the validation of the digital ticket.

In yet another embodiment, a non-transitory computer-readable storage medium may store instructions that when executed by a computer cause the computer to perform a method for communicating with a device. The method may include obtaining a digital ticket, a ticket-server signature, and a device signature from a ticket holder's device. The digital ticket may be obtained from a ticket server by the ticket holder's device, the ticket-server signature may be generated based on the digital ticket using a private key associated with the ticket server, and the device signature may be generated based on the digital ticket using a private key associated with the ticket holder's device. The method may be further include validating the digital ticket. The validation of the digital ticket may include verifying the ticket-server signature using a public key corresponding to the private key associated with the ticket server, and verifying the device signature using a public key corresponding to the private key associated with the ticket holder's device. Moreover, the method may further include causing generation of an output based on a result of the validation of the digital ticket.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Aspects of the disclosure pertains to computer systems and methods for providing and validating a digital ticket. More particularly, the present disclosure relates to computer systems and methods for providing and validating a digital ticket that are capable of detecting and rejecting fraudulent digital tickets. For example, the disclosed systems and methods may detect and reject digital tickets that have been copied (e.g., screenshot or photographed) and/or previously used.

Example Operating Environments

Figure 1:
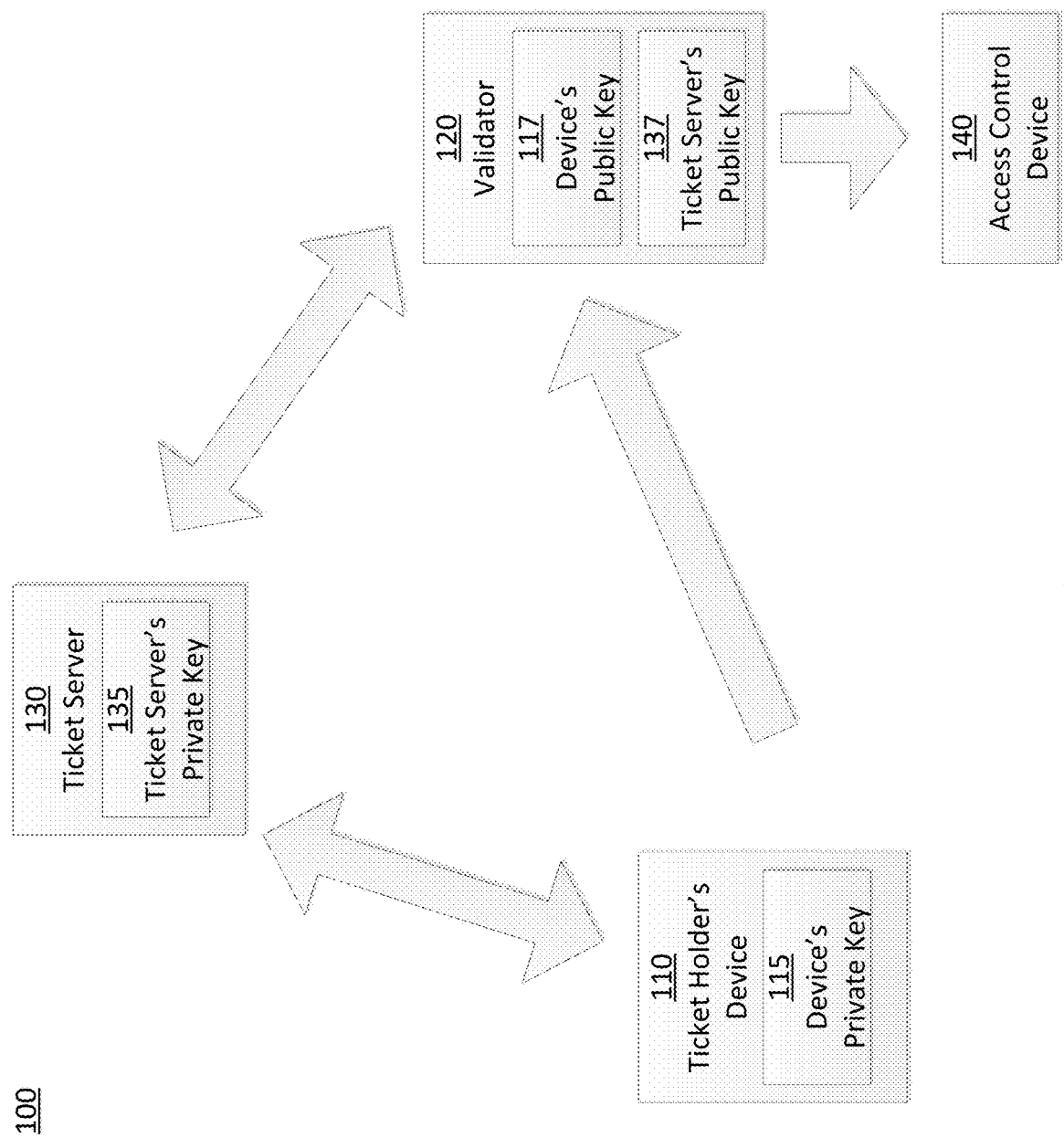
FIG. 1 illustrates an example digital ticketing system in accordance with the disclosed embodiments.

FIG. 1 illustrates an example digital ticketing system 100 in which concepts consistent with the principles of the invention may be implemented. As shown in FIG. 1, system 100 includes a ticket holder's device 110, a validator 120, a ticket server 130, and an access control device 140.

Ticket holder's device 110 may be any device capable of providing data directly and/or indirectly to validator 120. The data may include, for example, a digital ticket previously purchased by the ticket holder. In some embodiments, ticket holder's device 110 may be a portable device, such as a cellular phone, PDA, tablet, laptop, smart watch. Alternatively, or additionally, ticket holder's device 110 may be a dedicated device (e.g., a fob) for providing the data. In some embodiments, ticket holder's device 110 may be a general-purpose electronic device (e.g., tablet, cellular phone, laptop) executing one or more pieces of software (e.g., an app) implementing the functions of ticket holder's device 110.

In some embodiments, ticket holder's device 110 may provide the data (e.g., a digital ticket) by transmitting the data using a transmitter. For example, ticket holder's device 110 may transmit the data using a transmitter that may be included in, or accessible to, ticket holder's device 110 to a receiver that may be included in, and/or accessible to, validator 120. The transmitter of ticket holder's device 110 and the receiver of validator 120 may be based on, for example, Wi-Fi, Bluetooth, near-field communication (NFC), infrared, and/or audio-based contactless communication technologies.

Additionally, or alternatively, ticket holder's device 110 may provide the data to validator 120 by making the data available for retrieval by validator 120 or by another device/component connected to validator 120. For example, ticket holder's device 110 may provide data by causing display of a visual content encoded with the data (e.g., barcode, QR code, or AZTEC) on a display of ticket holder's device 110. Subsequently, a camera included in, or accessible to, validator 120 may capture and decode the visual content to obtain the data. In another example, ticket holder's device 110 may store the data on a data store accessible by validator 120, and subsequently, validator 120 may retrieve the stored data from the data store.

As used herein, a "digital ticket" may be a set of data that identifies and/or defines one or more products and/or services that may have been purchased (or authorized to use) by the ticket holder. For example, a digital ticket may include identifiers of one or more products and/or services, usable time periods, blackout periods, an expiration time/date, and/or a valid duration. The products and/or services may have been purchased, for example, by the ticket holder via an app on ticket holder's device 110, an e-commerce website, a dedicated kiosk, and/or a salesperson at a ticket counter. After the purchase, ticket holder's device 110 may have obtained the digital ticket associated with the purchased products and/or services from ticket server 130.

Ticket server 130 may be any physical or virtual server capable of providing the digital ticket associated with the purchased products and/or services to ticket holder's device 110. In some embodiments, ticket server 130 may be a group of physical and/or virtual servers. In some embodiments, at least some functions of ticket server 130 may be implemented on a cloud platform such as Amazon Web Services, Microsoft Azure, or Google Cloud.

In some embodiments, ticket server 130 may maintain records (e.g., identifiers) of digital tickets that have been used, unused, and/or voided. In some embodiments, ticket server 130 may maintain records (e.g., identifiers) of ticket holder's devices, pieces of software executing on ticket holder's devices, and validators that may have been compromised. In some embodiments, ticket server 130 may be further capable of providing such records, or data derived from such records, to validator 120 and/or ticket holder's device 110.

Validator 120 may be any device capable of obtaining and validating the digital ticket provided by ticket holder's device 110. Validator 120 may use the information provided by ticket holder's device 110 (e.g., the digital ticket), information available locally to validator 120 (e.g., records of digital tickets validator 120 has validated), and/or information provided by ticket server 130 (e.g., records of digital tickets that have been used, unused, and/or voided in system 100) to determine whether the digital ticket is valid or not. Based on the validation result, validator 120 may cause access control device 140 to generate an output, which may include, for example, displaying that the digital ticket is valid/invalid and/or unlocking an electronically controlled gate.

In some embodiments, validator 120 may be an immobile device and/or mounted to a fixed structure. For example, validator 120 may be attached to an electronically controlled gate in a transit station. In another example, validator may be mounted on a fixed structure (e.g., a pole) inside a vehicle. Alternatively, validator 120 may be a portable device. For example, validator 120 may be a portable device carried and operated by an operator. In some embodiments, validator 120 may be placed at a location where ticket holders must pass through to use the purchased products and/or services (e.g., at an entrance/exit of a transit station), and access control device 140 may control the ticket holder's access to such a location based on the digital ticket validation results.

Access control device 140 may be any device that can generate an output indicative of whether a person is permitted or denied from proceeding beyond the location of access control device 140. In some embodiments, validator 120 may be implemented on an embedded controller inside access control device 140. Alternatively, validator 120 may be external to access control device 140. Validator 120 may control access control device 140 using a wired connection or wirelessly. In some embodiments, validator 120 may control a plurality of access control devices.

In some embodiments, access control device 140 may be a gate or a door, which may be electronically controlled such that the gate/door is locked when a person is denied from proceeding and unlocked/turned when the person is permitted to proceed. Additionally, or alternatively, access control device 140 may include a speaker that produces sound, and the produced sound may be indicative of whether a person is permitted or denied from proceeding. In some embodiments, access control device 140 may include a display monitor that displays a visual content indicative of whether a person is permitted or denied from proceeding. In some embodiments, access control device 140 may include one or more light emitting devices, and access control device 140 may turn on or off one or more of the light emitting devices to indicate whether the rider is permitted or denied form proceeding.

As shown in FIG. 1, ticket holder's device 110 may communicate with ticket server 130 (e.g., to obtain digital tickets). In some embodiments, ticket holder's device 110 and ticket server 130 may communicate with each other via the Internet. Alternatively, or additionally, ticket holder's device 110 and ticket server 130 may communicate with each other via a private network. Ticket holder's device 110 may connect to the internet and/or the private network via a communication module that may be included in, or accessible to, ticket holder's device 110. The communication module may be based on Bluetooth, W-Fi, 3G, and/or 4G LTE, to provide some examples. For example, ticket holder's device 110 may communicate with ticket server 130 using secure HTTPS connections.

Further as shown in FIG. 1, validator 120 may communicate with ticket server 130. For example, validator 120 may provide ticket server 130 with records (e.g., identifiers) of digital tickets that have been validated by validator 120. In some embodiments, validator 120 and ticket server 130 may communicate with each other via the Internet. Alternatively, or additionally, validator 120 and ticket server 130 may communicate with each other via a private network. Validator 120 may connect to the internet and/or the private network via a communication module that may be included in, or accessible to, validator 120. The communication module may be based on Bluetooth, 3G, and/or 4G LTE communication technologies, to provide some examples. In some embodiments, the communication between validator 120 and ticket server 130 may be encrypted. For example, validator 120 may communicate with ticket server 130 using secure HTTPS connections.

In some situations, validator 120's ability to communicate with ticket server 130 may be interrupted. For example, validator 120 may be inside a vehicle passing through an underground tunnel. Thus, in some embodiments, when validator 120's ability to communicate with ticket server 130 is interrupted, validator 120 may store the data that needs to be transmitted to ticket server 130 in a local data store. When validator 120's ability to communicate with ticket server 130 is restored, the data in the local data store may be transmitted to ticket server 130. As an example, after validator 120's ability to communicate with ticket server 130 is interrupted, validator 120 may begin storing records of digital tickets that have been validated by validator 120. After validator 120's ability to communicate with ticket server 130 is restored, validator 120 may provide the stored records to ticket server 130 in batch.

Ticket holder's device 110, validator 120, and ticket server 130 may have access to various public and/or private digital keys. As shown in FIG. 1, for example, ticket server 130 may have access to a private key associated with ticket server 130 ("ticket server's private key 135"). In some embodiments, ticket server's private key 135 may be stored on ticket server 130. Alternatively, or additionally, ticket server's private key 135 may be stored on a data store accessible by ticket server 130. In some embodiments, ticket server's private key 135 may be stored on a hardware security module (HSM), embedded secure element (eSE), secure access module (SAM), and/or trusted execution environment (TEE).

Further as shown in FIG. 1, validator 120 may have access to a public key corresponding to ticket server 130's public key ("ticket server's public key 137"). In some embodiments, ticket server's public key 137 may be stored on validator 120. Alternatively, or additionally, ticket server's public key 137 may be stored on a data store accessible by validator 120. In some embodiments, ticket server's public key 137 may be stored on a HSM, SE, and/or TEE.

Moreover, ticket holder's device 110 may have access to a private key associated with ticket holder's device 110 ("device's private key 115"). In some embodiments, device's private key 115 may be stored on ticket holder's device 110. Alternatively, or additionally, device's private key 115 may be stored on a data store accessible by ticket server 130. In some embodiments, device's private key 115 may be stored on a HSM, SE, and/or TEE.

In some embodiments, device's private key 115 may be a derived key (or a composed key) that is derived based on secret data known to both the ticket holder's device 110 and the validator 120.

As shown in FIG. 1, validator 120 may further have access to a public key corresponding to device's public key 117. In some embodiments, device's public key 117 may be stored on validator 120. Alternatively, or additionally, device's public key 117 may be stored on a data store accessible by validator 120. In some embodiments, device's public key 117 may be stored on a HSM, SE, and/or TEE.

Private key 115 and public key 117 may be associated to one ticket holder's device 110. Alternatively, private key 115 and public key 117 may be associated with a plurality of ticket holders' devices. That is, private key 115 may be shared among the plurality of ticket holders' devices.

While public/private key pairs have many different uses, in system 100, a private key may be used to generate a digital signature based on given data (i.e., to "sign the data"), and a corresponding public key (i.e., a public key that was generated with the private key using a public-key cryptography algorithm) may be used to verify that the generated digital signature is indeed generated by an entity that has access to the corresponding private key. Additionally, the corresponding public key may be used to further verify that the signed data has not been altered since the digital signature was generated.

A digital signature may be generated in numerous ways. In one example, a digital signature may be generated by encrypting a hash value of given data using a private key. In this example, a corresponding public key may be used to decrypt the digital signature and obtain the hash value of the original data. Thus, if the decrypted digital signature matches the hash value of the received data, it may prove that (i) the data was signed with a private key that corresponds to the public key, and (ii) the data has not changed since it was signed. However, if the decrypted digital signature does not match the hash value of the received data, the data has been altered and/or the digital signature was created with a private key that does not correspond to the public key.

In another example, a digital signature may also be generated by encrypting a portion or all of the given data using a private key. Here, a corresponding public key may be used to decrypt the digital signature to obtain the portion of, the data or the entire data. Subsequently, the decrypted digital signature may be compared to the received data to determine (i) that the data was signed with a private key that corresponds to the public key, and (ii) that the data has not changed since it was signed. It may be advantageous in terms of performance, however, to generate a digital signature based on a hash value rather than a portion or all of the given data because the size of a hash value is typically smaller than the size of the data.

Figure 2:
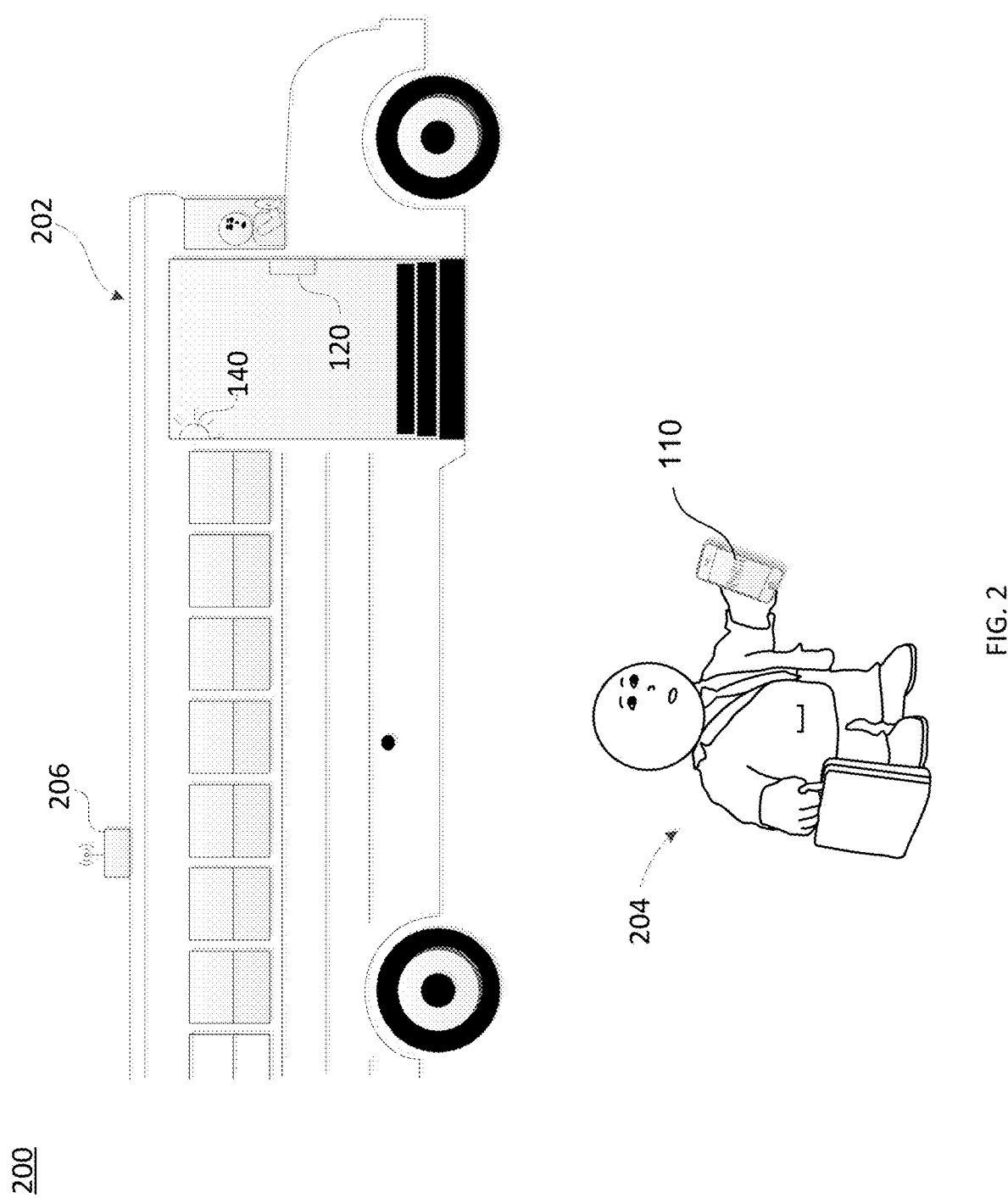
FIG. 2 illustrates an example digital ticketing system deployed on a vehicle in accordance with the disclosed embodiments.

FIG. 2 illustrates an example digital ticketing system 200 in which concepts consistent with the principles of the invention may be implemented. System 200 is similar to system 100 of FIG. 1 except that validator 120 is deployed on a vehicle 202.

As shown in FIG. 2, validator 120 may be located near vehicle 202's door so that ticket holder 204 is able to use ticket holder's device 110 to provide a digital ticket to validator 120 as he/she boards vehicle 202. Alternatively, or additionally, validator 120 may be operated by a human operator (e.g., bus driver). In some embodiments, validator 120 may be mounted on a 1.25-inch stanchion and connected to the bus power and router 204 using a wiring harness.

As discussed above, validator 120 may communicate with ticket server 130. In the example system of FIG. 2, validator 120 may communicate with ticket server 130 (not shown in FIG. 2) using a router 206 installed on vehicle 202. For example, router 206 may implement cellular communication technology that can connect validator 120 to the Internet and/or a private network that includes ticket server 130 using cellular communication networks. Router 206 may communicate with validator 120 using a wired connection (e.g., Ethernet) or a wireless connection (e.g., W-Fi). In some embodiments, router 206 may further provide ticket holder's device 110 with an access to the Internet and/or ticket server 130.

Moreover, in system 200, access control device 140 may include one or more light indicators, which changes color based whether validator 120 has determined the digital ticket to be valid or not. For example, a green light may turn on after validator 120 has determined the digital ticket to be valid, and a red light may turn on after validator 120 has determined the digital ticket to be invalid. If a ticket holder attempts to board vehicle 202 when a red light is turned on, an operator (e.g., bus drive) of vehicle 202 may intervene to prevent the ticket holder 204 from boarding.

In FIG. 2, an operator may verify that validator 120 is functioning properly by providing a maintenance instruction to validator 120. The maintenance instruction may be provided to validator 120 in the same manner as digital tickets. For example, an operator may display (e.g., on an operator's device) a QR code associated with one or more maintenance processes, which may be captured by validator 120. After decoding the captured QR code, validator 120 may perform the maintenance processes associated with the QR code. For example, validator 120 may perform a full system check.

Furthermore, an operator may configure validator 120 by providing a configuration instruction to validator 120. The configuration instruction may be provided to validator 120 in the same manner as digital tickets. For example, an operator may display (e.g., on an operator's device) a QR code associated with a bus route, which may be captured by validator 120. After decoding the captured QR code, validator 120 may configure itself for the bus route associated with the scanned QR code.

In some embodiments, validator 120 may be configured remotely. For example, validator 120 may communicate with a remote device management system, which may provide configuration instruction to validator 120 when requested by validator 120 and/or when an updated configuration instruction is available at the remote device management system. In some embodiments, the remote device management system may generate configuration instructions based on computer-aided dispatch (CAD) system.

FIG. 2 illustrates an example digital ticketing system 300 in which concepts consistent with the principles of the invention may be implemented. System 300 is similar to system 100 of FIG. 1 except that validator 120 is deployed on a transit station.

Figure 3:
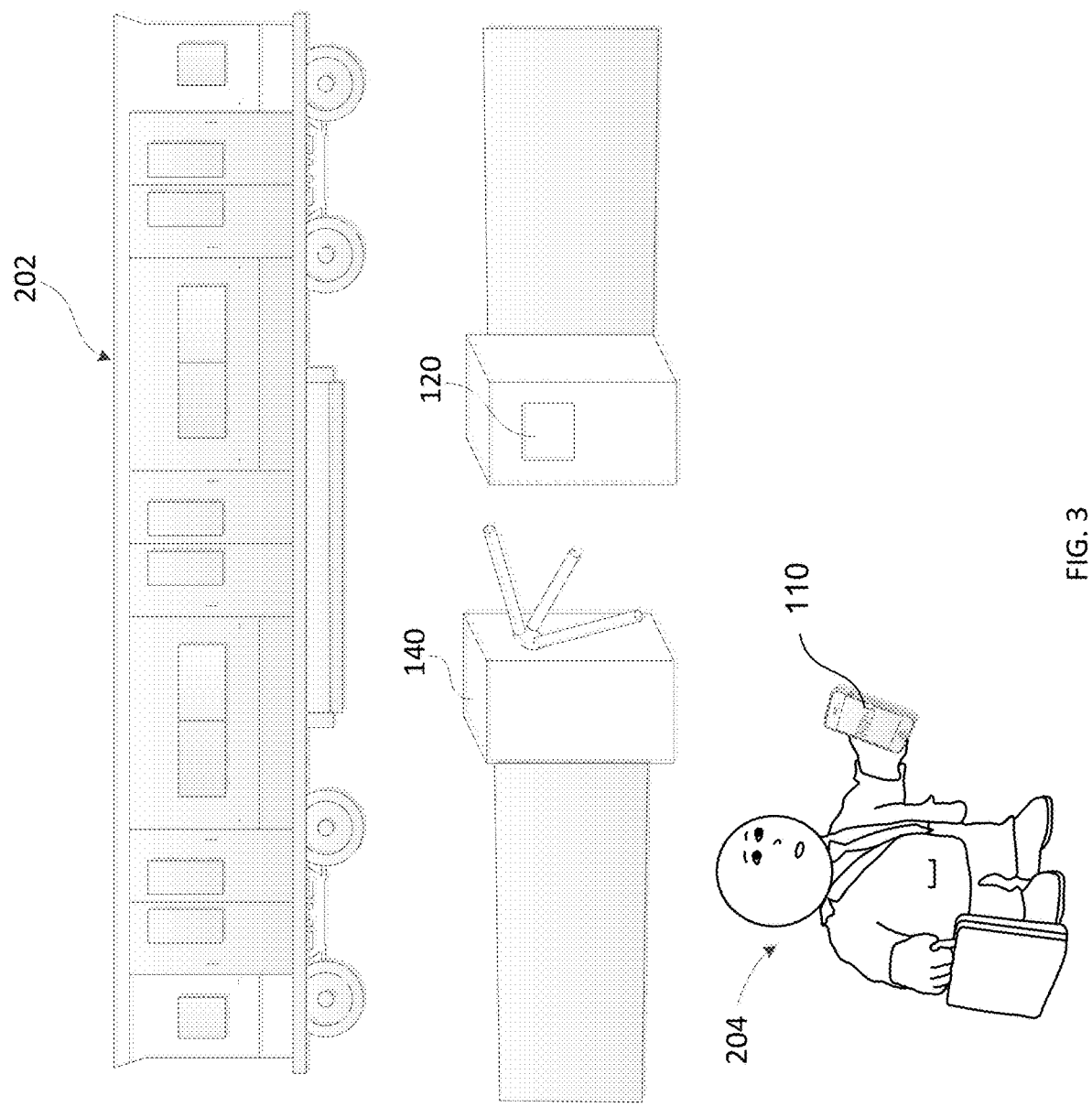
FIG. 3 illustrates an example digital ticketing system deployed in a transit station in accordance with the disclosed embodiments.

As shown in FIG. 3, validator 120 may be located near at an entrance of the transit station so that ticket holder 204 may use ticket holder's device 110 to provide a digital ticket to validator 120 as ticket holder 204 enters the transit station. Alternatively, or additionally, validator 120 may be operated by a human operator stationed near the entrance. In the example system of FIG. 3, access control device 140 may be an access gate or a swivel gate that is unlocked after validator 120 has determined the digital ticket to be valid.

An Example Validation Process

Figure 4:
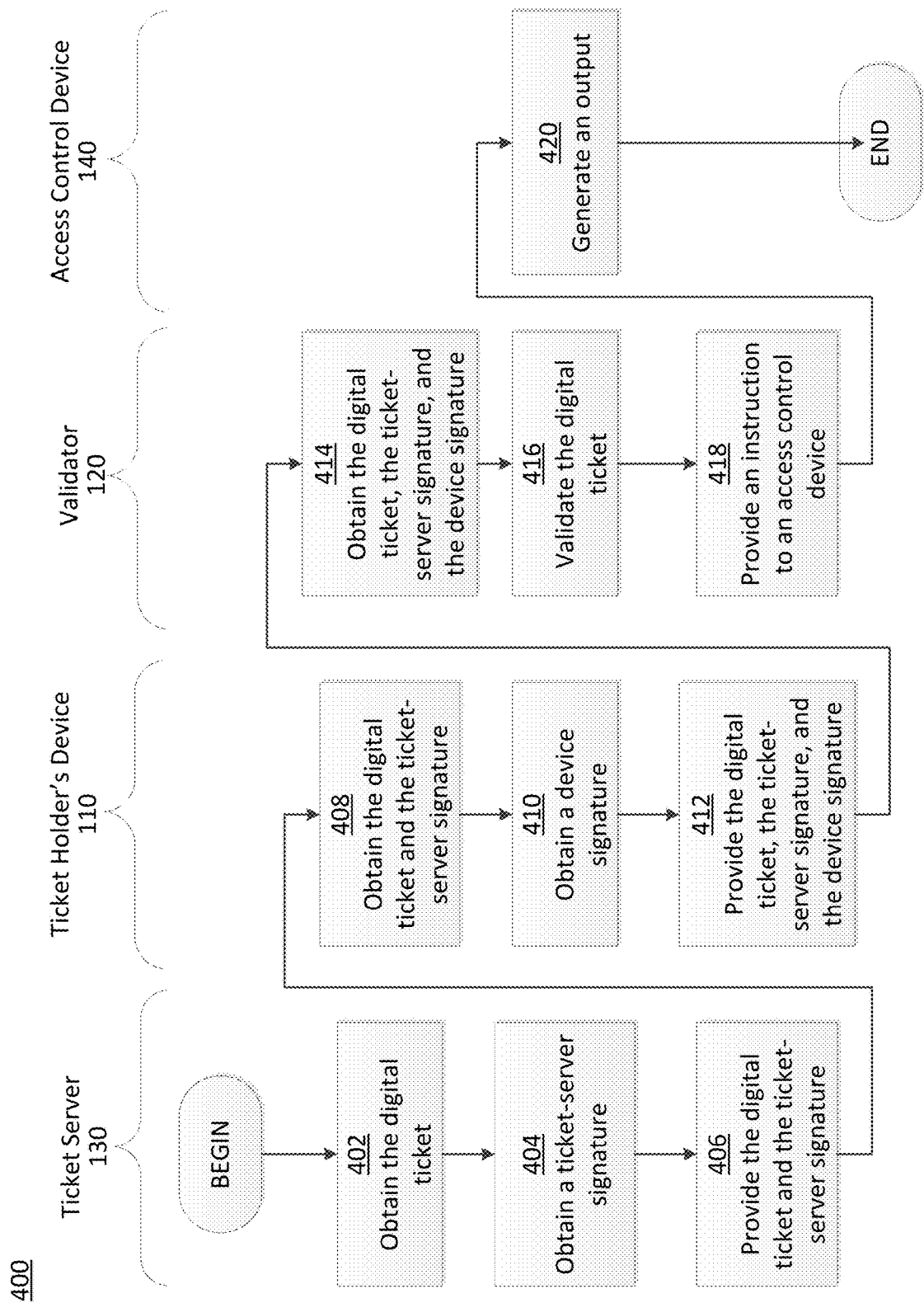
FIG. 4 illustrates a process for validating a digital ticket in accordance with the disclosed embodiments.

FIG. 4 illustrates an example of a process 400 implemented by digital ticketing system 100 for providing and validating a digital ticket in accordance with the disclosed embodiments. Digital ticketing system 100 implementing process 400 may be capable of detecting fraudulently obtained and/or used digital tickets. As shown in the example of FIG. 4, steps 402-406 may be implemented by ticket server 130, steps 408-412 by ticket holder's device 110, steps 414-418 by validator 120, and step 420 by access control device 140.

At a step 402, ticket server 130 may obtain a digital ticket. In some embodiments, ticket server 130 may generate the digital ticket. Alternatively, ticket server 130 may cause generation of the digital ticket and obtain the generated digital ticket. For example, ticket server 130 may request a ticket generation server to generate a digital ticket and retrieve/receive the generated ticket from the ticket generation server.

In some embodiments, ticket server 130 may obtain the digital ticket in response to receiving an indication that a purchase process for one or more products or services has been completed, for example, by a ticket holder. As discussed above, a ticket holder may complete a purchase process using an app or a web browser executing on ticket holder's device 110 or via a kiosk. Alternatively, a ticket holder may complete an offline purchase process through a salesperson. The purchase process may include obtaining a selection(s) of product(s)/service(s), payment information, and/or personal information of the ticket holder.

As discussed above, a digital ticket may be a set of data that identifies and/or defines one or more purchased products and/or services. For example, a digital ticket may include identifiers of purchased products and/or services. In another example, a digital ticket may further include usable time periods, blackout periods, an expiration time/date, and/or a valid duration. Some of the data that may be included the digital ticket, such as an expiration time/date and a valid duration, may be determined based on the products and/or services purchased and/or based on one or more business rules. For example, a discounted product/service may have a shorter valid duration, while a full-priced product/service may have a relatively longer valid duration. Additionally, or alternatively, some of the data that may be included the digital ticket, such as identifiers of purchased products and/or services, may be determined based on the information collected during the purchase process. In an example where the digital ticketing system is deployed on a transit system (e.g., system 300 of FIG. 3), the identifiers of purchased products and/or services may include identifiers of a transit route, fare type, and/or rider type (e.g., regular, disabled, senior, college, etc.).

At a step 404, ticket server 130 may obtain a ticket-server signature generated at least based on the obtained digital ticket. In some embodiments, ticket server 130 may generate the ticket-server signature. Alternatively, ticket server 130 may cause the ticket-server signature to be generated and obtain the generated ticket-server signature. For example, ticket server 130 may instruct a signature generator to generate the ticket-server signature and obtain the ticket-server signature generated by the signature generator.

The ticket-server signature may be generated using ticket server's private key 135. For example, the ticket-server signature may be generated by encrypting a hash value of the digital ticket with ticket server's private key 135. In another example, the ticket-server signature may be generated by encrypting at least a portion of the digital ticket with ticket server's private key 135.

As discussed above in reference to FIG. 1, in embodiments where the ticket-server signature is generated by ticket server 130, ticket server's private key 135 may be stored on ticket server 130 or a data store accessible to ticket server 130. In embodiments where the ticket-server signature is generated by an entity other than ticket server 130 (e.g., a signature generator), ticket server's private key 135 may be stored on a data store in, or accessible by, the entity. In some embodiments, a limited number of entities (e.g., ticket server 130 and/or ticket server 130's signature generator) may have access to ticket server's private key 135.

Accordingly, any entity that has access to the digital ticket, the ticket-server signature, and ticket server's public key 137 (e.g., validator 120) may determine: (i) whether the digital ticket has been indeed signed by ticket server 130, and (ii) whether the digital ticket has not been altered since it was signed by ticket server 130. Thus, such an entity may detect digital tickets that have been generated and/or altered by an unauthorized entity.

In some embodiments, the ticket-server signature may be generated further based on time-dependent data such as a timestamp representing the time and/or date at which the ticket-server signature is obtained/generated. In these embodiments, two ticket-server signatures obtained/generated based on the same digital ticket at two different times may be different.

In some embodiments, after generating the ticket-server signature based on a digital ticket, ticket server 130 may generate a new ticket-server signature based on the same digital ticket. For example, ticket server 130 may generate a new ticket-server signature after a predetermined time from when the last ticket-server signature was generated based on the same digital ticket. In another example, ticket server 130 may generate a new ticket-server signature upon request by ticket holder's device 110. In embodiments where the ticket-server signature is generated further based on time-dependent data, the new ticket-server signature may be different from the previous ticket-server signature.

At a step 406, ticket server 130 may provide the digital ticket and the ticket-server signature. For example, ticket server 130 may provide the digital ticket and the ticket-server signature to ticket holder's device 110. In some embodiments, as discussed above in reference to FIG. 1, ticket server 130 may transmit the digital ticket and the ticket-server signature, for example, to ticket holder's device 110. Alternatively, or additionally, ticket server 130 may make the digital ticket and the ticket server signature available for retrieval, for example, by ticket holder's device 110. In embodiments where a new ticket-server signature is generated after step 404, the new ticket-server signature and/or the digital ticket may be provided (e.g., to ticket holder's device 110) after the new ticket server signature is generated.

At a step 408, ticket holder's device 110 may obtain the digital ticket and the ticket-server signature. For example, ticket holder's device 110 may receive or retrieve the digital ticket and the ticket-server signature from ticket server 130. In embodiments where a new ticket-server signature is generated after step 404, ticket holder's device 110 may further obtain the new ticket-server signature. In these embodiments, ticket holder's device 110 may replace the previous ticket-server signature with the new ticket-server signature. In some embodiments, at least a portion of the digital ticket may be stored on a secure storage area of ticket holder's device 110.

At an optional step after step 408, ticket holder's device 110 may remove the obtained digital ticket and/or the ticket-server signature. For example, ticket holder's device 130 may remove the obtained digital ticket after the expiration date/time or the valid duration defined in the digital ticket has passed.

At another optional step after step 408, ticket holder's device 110 may synchronize with ticket server 130. During the synchronization, one or more digital tickets previously obtained by ticket holder's device 110 at step 406 may be updated, removed, or marked as being revoked. In one example, ticket server 130 may have obtained an indication that one or more digital tickets obtained by ticket holder's device 110 has been used. In this example, the used digital tickets may be removed during the synchronization with ticket server 130. In another example, ticket server 130 may have received an indication that a ticket holder completed a purchase process to upgrade a previously purchased service or product. In this example, an updated digital ticket may be provided along with an updated ticket-server signature during the synchronization with ticket server 130. In yet another example, ticket server 130 may have received an indication that one or more digital tickets obtained by ticket holder's device 110 have been compromised. In this example, the compromised digital tickets may be marked as being revoked or removed from ticket holder's device 110 during the synchronization with ticket server 130. Ticket holder's device 110 may synchronize with ticket server 130 periodically, after a predetermined amount of time from when the last digital ticket was obtained/generated, and/or upon request by ticket server 130, ticket holder's device 110, or validator 120.

At a step 410, ticket holder's device 110 may obtain a device signature generated at least based on the obtained digital ticket. In some embodiments, the device signature may be generated further based on the ticket-server signature. In some embodiments, ticket holder's device 110 may generate the device signature. Alternatively, ticket holder's device 110 may cause the device signature to be generated and obtain the generated device signature. For example, ticket holder's device 110 may request a signature generator to generate the ticket-server signature and obtain the device signature generated by the signature generator.

The device signature may be generated using device's private key 115. For example, the device signature may be generated by encrypting a hash value of the digital ticket with device's private key 115. In another example, the device signature may be generated by encrypting at least a portion of the digital ticket with device's private key 115.

In some embodiments, device's private key 115 may be a derived private key that is generated by ticket holder's device 110 based on a master key and secret data. The secret data may also be known by the validator 120, thus enabling validator 120 to generate a public key corresponding to the derived public key generated by ticket holder's device 110. In embodiments where ticket holder's device 110 is a general-purpose electronic device executing one or more pieces of software implementing the functions of ticket holder's device 110, the secret data may be included as a part of the pieces of software. For example, the secret data may be provided to ticket holder's device 110 as a part of an app implementing ticket holder's device 110. In some embodiments, the secret data may be changed and the new secret data may be provided to ticket holder's device 110 and validator 120. In some embodiments, the secret data may be changed and provided to ticket holder's device 110 and validator 120 periodically and/or when the secret data is deemed to have been compromised. In these embodiments, the new secret data may be provided to ticket holder's device 110 as a part of an update to the pieces of software implementing ticket holder's device 110, and to validator 120 as a part of a configuration instruction for validator 120 and/or as a part of an update to the pieces of software implementing validator 120.

In some embodiments, the device signature may be generated further based on device data. The device data may include any data available to ticket holder's device 110. For example, the device data may include outputs from one or more sensors, user interfaces, receivers accessible by ticket holder's device 110.

In some embodiments, the device data may include time-dependent data. For example, the device data may include a timestamp representing the time and/or date at which the device signature is generated/obtained. In another example, the device signature may be generated further based on an expiration time/date of the digital ticket, which may be a predetermined amount time (e.g., 2 minutes) after the device signature is generated.

In some embodiments, the device data may include a timestamp representing the time and/or date at which ticket holder's device 110 has last synchronized with ticket server 130.

In some embodiments, the device data may include data indicative of a location-dependent data. For example, the device data may include the current location (e.g., a GPS coordinate) of ticket holder's device 110.

In some embodiments, ticket holder's device 110 may generate a new device signature based on the same digital ticket and/or the ticket-server signature. For example, ticket holder's device 110 may generate a new device signature after a predetermined time from when the last device signature was generated. In another example, ticket holder's device 110 may generate a new device signature upon obtaining an updated digital ticket and/or ticket-server signature from ticket server 130. In yet another example, ticket holder's device 110 may generate a new device signature in response to an input from the ticket holder (e.g., to provide the digital ticket to validator 120). In embodiments where the device signature is generated based on time-dependent data, the new device signature may be different from the previous device signature, even though the new device signature is generated based on the same digital ticket and/or the same ticket-server signature.

At a step 412, ticket holder's device 110 may provide the digital ticket, the ticket-server signature, and the device signature. In embodiments where the device signature is based on the device data, ticket holder's device 110 may further provide the device data.

In some embodiments, ticket holder's device 110 may provide the digital ticket, the ticket-server signature, and the device signature in response to an input from the ticket holder. In some embodiments, ticket holder's device 110 may provide the digital ticket, the ticket-server signature, and the device signature after ticket holder's device 110 is placed near validator 120. In some embodiments, ticket holder's device 110 may provide the digital ticket, the ticket-server signature, and the device signature in response to a request from validator 120. In some embodiments, ticket holder's device 110 may provide the digital ticket, the ticket-server signature, and the device signature after ticket holder's device 110 is detected by one or more beacons (e.g., Bluetooth beacons). In some embodiments, ticket holder's device 110 may provide the digital ticket, the ticket-server signature, and the device signature in response to ticket holder's device 110 completing step 410 (i.e., obtaining the device signature). For example, ticket holder's device 110 may provide the digital ticket, the ticket-server signature, and the device signature immediately after obtaining the device signature.

In some embodiments, the digital ticket, the ticket-server signature, and the device signature provided may be provided using a data format that cannot be readily read and understood by a human being. For example, the digital ticket, the ticket-server signature, and the device signature may be obfuscated. By providing the data using a data format that cannot be readily read and understood by a human being, a simple interception of the data originating from ticket holder's device 110 may not sufficient to reverse engineer the data to and fraudulently generate/provide digital tickets.

As discussed above, ticket holder's device 110 may provide the digital ticket, the ticket-server signature, and the device signature by transmitting them, for example, to validator 120. Alternatively, or additionally, provide the digital ticket, the ticket-server signature, and the device signature by making them available for retrieval by validator 120. For example, ticket holder's device 110 may encode the digital ticket, the ticket-server signature, and the device signature as one or more barcodes and/or QR codes, and display the barcodes/QR codes on a display included in, or connected to, ticket holder's device 110. Validator 120 may subsequently retrieve the digital ticket, the ticket-server signature, and the device signature by capturing and decoding the barcodes/QR codes.

In embodiments where ticket holder's device 110 further provides time-dependent device data, the generated barcode/QR code may be time dependent. That is, the barcodes and QR codes generated at two different times may or may not have different barcodes/QR codes for the same digital ticket. In embodiments where ticket holder's device 110 includes location-dependent device data, the generated barcode/QR code may be location dependent. That is, barcodes and QR codes generated at two different locations will have different barcodes/QR codes for the same digital ticket. Barcodes and QR codes that are time and/or location dependent may prevent a person from copying the barcode/QR code (e.g., by taking a screenshot or a photograph) and presenting the copied, fraudulent barcode/QR code.

At a step 414, validator 120 may obtain the digital ticket, the ticket-server signature, and the device signature. In some embodiments, validator 120 may further obtain the device data.

At a step 416, validator 120 may validate the digital ticket. For example, validator 120 may determine whether the digital ticket is valid or not.

Validator 120 may determine that the digital ticket is valid after verifying the ticket-server signature and the device signature. In some embodiments, validator 120 may verify the device signature and then the ticket-server signature. Verifying the ticket-server signature ensures that: (i) the digital ticket has indeed been signed by ticket server 130, and (ii) the digital ticket has not been altered since it was signed by ticket server 130. Verifying the device signature further ensures that the digital ticket is indeed provided by ticket holder's device 110 (i.e., an authorized device). Therefore, verifying the ticket-server signature and the device signature ensures that the digital ticket was not fraudulently obtained from an entity other than ticket server 130 and that the digital ticket was not fraudulently provided using an unauthorized means (e.g., by an entity other than ticket holder's device 110).

The ticket-server signature may be verified using ticket server's public key 137. In an example where the ticket-server signature is generated by encrypting a cryptographic hash value of the digital ticket with ticket server's private key 135, the ticket-server signature may be verified using cryptographic hashing with ticket data, the ticket-server generated signature and the ticket server's public key 137. A match between the ticket-server signature and the generated hash value of the digital ticket may indicate that: (i) the digital ticket was generated by an entity with access to ticket server's private key 137 (e.g., ticket server 130), and (ii) the digital ticket has not been altered since the ticket-server signature was generated by the entity.

The device signature may be verified using device's public key 117. In an example where the device signature is generated by encrypting a hash value of the digital ticket with device's private key 115, the device signature may be verified by decrypting the device signature with device's public key 117, generating a hash value of the digital ticket, and comparing the decrypted device signature with the generated hash value of the digital ticket. A match between the decrypted device signature and the generated hash value of the digital ticket may indicate that (i) the digital ticket was generated by an entity with access to device's private key 115 (i.e., ticket holder's device 110), and (ii) the digital ticket has not been altered since the device signature was generated by the entity.

In some embodiments, validator 120 may determine that the digital ticket is valid after determining that the digital ticket has not expired. For example, validator 120 may determine that the digital ticket is valid after determining that the digital ticket has not expired based on the expiration date/time or the valid duration defined in the digital ticket.

In some embodiments, validator 120 may determine that the digital ticket is valid after determining that the device signature and/or the ticket-server signature has not expired. For example, validator 120 may determine that the digital ticket is valid after determining that the device signature and/or the ticket-server signature was generated within a predetermined amount time or within an amount of time defined in the digital ticket or the device data provided by ticket holder's device 110 or by business rules specified by the ticket issuing agency.

In embodiments where the digital ticket is provided using a barcode or a QR code, validator 120 may determine that the digital ticket is valid after determining that the barcode or the QR code was generated within a predetermined amount of time (e.g., within 2 minutes of the current time). A short valid duration (e.g., 2 minutes) may decrease the likelihood that a digital ticket reproduced using an unauthorized means (e.g., by copying) is determined valid by validator 120.

In some embodiments, validator 120 may determine that the digital ticket is valid after determining that ticket holder's device 110 synchronized with ticket server 130 at least once within a predetermined amount of time (e.g., in the last 8 hours). In these embodiments, validator 120 may detect fraudulent digital tickets obtained and provided using a "replay attack." A replay attack may involve a person restoring a backup of ticket holder's device 110 that was made prior to using the digital ticket; the digital ticket is indicated as unused in the backup of ticket holder's device 110. By ensuring that ticket holder's device 110 has been synchronized with ticket server 130 recently, ticket holder's device 110 is likely to be at the latest state. That is, the synchronization ensures, for example, that used digital tickets are removed from ticket holder's device 110 or indicated as having been used on ticket holder's device 110. Thus, the likelihood that a digital ticket obtained and/or provided using an unauthorized means (e.g., by restoring a ticket holder's device 110 backup that includes an unused digital ticket) is determined as being valid by validator 120 is decreased.

In embodiments where the device signature is based on a timestamp representing the time and/or date at which the device signature is provided or a timestamp representing an expiration time/date of the device signature or the digital ticket, the verification of the device signature may include verifying that the device signature has not expired based on the timestamp.

In some embodiments, validator 120 may validate the digital ticket based on configuration data associated with validator 120. In an example where validator 120 is deployed on a vehicle, the configuration data associated with validator 120 may include route information of the vehicle associated with validator 120. In this example, validator 120 may determine that the digital ticket is valid if the products/services associated with the digital ticket is authorized for the route of the vehicle. In some embodiments, the configuration data may be obtained using the same method as the digital ticket. For example, the configuration data may be obtained by capturing and decoding a barcode or a QR code encodes the configuration data. In these embodiments, the barcode or the QR code may be provided by an operator's device or a maintenance card carried by an operator. The operator may be, for example, a driver of the vehicle associated with validator 120.

In some embodiments, validator 120 may validate the digital ticket based on ticket-server data, which may be obtained from ticket server 130. The ticket-server data may include, for example, data indicative of whether the digital ticket has already been used and/or whether the digital ticket is currently listed in a negative list. Validator 120 may determine that the digital ticket is invalid if the digital ticket has been recorded as being used and/or if the digital ticket is currently listed in a negative list.

In some embodiments, in addition to digital tickets (or identifiers of digital tickets), the negative list may further include, for example, identifiers of ticket holder's devices and/or validators. Validator 120 may determine that a digital ticket is invalid if ticket holder's device 110 and/or validator 120 is identified in the negative list. In some embodiments, the negative list may be updated periodically, when requested by validator 120, and/or when validator 120 is turned on or restarted.

In embodiments where the device data provided by ticket holder's device 110 includes a location of ticket holder's device 110, validator 120 may determine that the digital ticket is valid after determining that the current location of validator 120 is within a predetermined distance from the provided location of ticket holder's device 110. In these embodiments, validator 120 may include, or have access to, a GPS receiver. By verifying that the current location of validator 120 is within a predetermined distance from the provided location of ticket holder's device 110, the likelihood that a digital ticket fraudulently reproduced using an unauthorized means (e.g., by copying) is determined valid by validator 120 is reduced.

In some embodiments, validator 120 may validate the digital ticket using data that were previously obtained from other ticket holders' devices. For example, validator 120 may maintain records of digital tickets that were previously validated by validator 120 or by a group of validators that validator 120 is a part of. In this example, validator 120 may determine that a digital ticket is invalid if the same digital ticket is recorded as having been used. By maintaining such records, validator 120 may detect when ticket holder's device 110 is used multiple times by multiple people (e.g., by physically sharing ticket holder's device 110 among them) to provide the same digital ticket to validator 120. In some embodiments, validator 120 may maintain records of digital tickets that were previously validated within a predetermined amount time (e.g., last 10 minutes).

At an optional step, validator 120 may provide ticket server 130 an indicator that the digital ticket has been validated at validator 120. The indicator may include, for example, whether the digital ticket was determined to be valid or invalid, time and/or date of the validation, location of validator 120 at the time of the validation, one or more data included in the digital ticket and/or device data, raw data provided by ticket holder's device 110, an identifier of validator 120, methods used for obtaining data from ticket holder's device 110, and/or an identifier of ticket holder's device 110.

In some embodiments, an indicator may be provided to ticket server 130 after every time the digital ticket is validated at validator 120. Alternatively, indicators may be provided to ticket server 130 in batch. For example, indicators may be provided to ticket server 130 after validating a predetermined number of digital tickets and/or periodically.

As discussed above, in some situations, validator 120's ability to communicate with ticket server 130 may be interrupted. For example, validator 120 may be inside a vehicle passing through an underground tunnel. Thus, in some embodiments, when validator 120's ability to communication with ticket server 130 is interrupted, validator 120 may store the indicators destined for ticket server 130 until the communication with ticket server 130 is restored. After the communication with ticket server 130 is restored, the stored indicators may be provided to ticket server 130 in batch.

At another optional step, ticket server 130 may update the digital ticket based on the obtained indicator(s). In one example, ticket server 130 may remove the digital ticket on ticket server 130 and/or cause removal of the digital ticket on ticket holder's device 110.

At a step 418, validator 120 may provide an instruction to access control device 140. The instruction may be generated based on the result of the validation at step 416.

At a step 420, access control device 140 may generate an output based on the instruction provided by validator 120.

As discussed above, the generated output may be indicative of whether a person is permitted or denied from proceeding beyond the location of access control device 140. For example, access control device 140 may be a gate or a door. The gate or door may be electronically controlled such that the gate or door is locked when a person is denied from proceeding and unlocked/turned when the person is permitted to proceed. Additionally, or alternatively, access control device 140 may include a speaker that produces a sound, and the produced sound may be indicative of whether a person is permitted or denied from proceeding. In some embodiments, access control device 140 may include a display monitor that displays a visual content indicative of whether a person is permitted or denied from proceeding. In some embodiments, access control device 140 may include one or more light emitting devices, and access control device 140 may turn on or off one or more light emitting devices to indicate whether the rider is permitted or denied form proceeding.

Example Software Provisioning Processes

Figure 5:
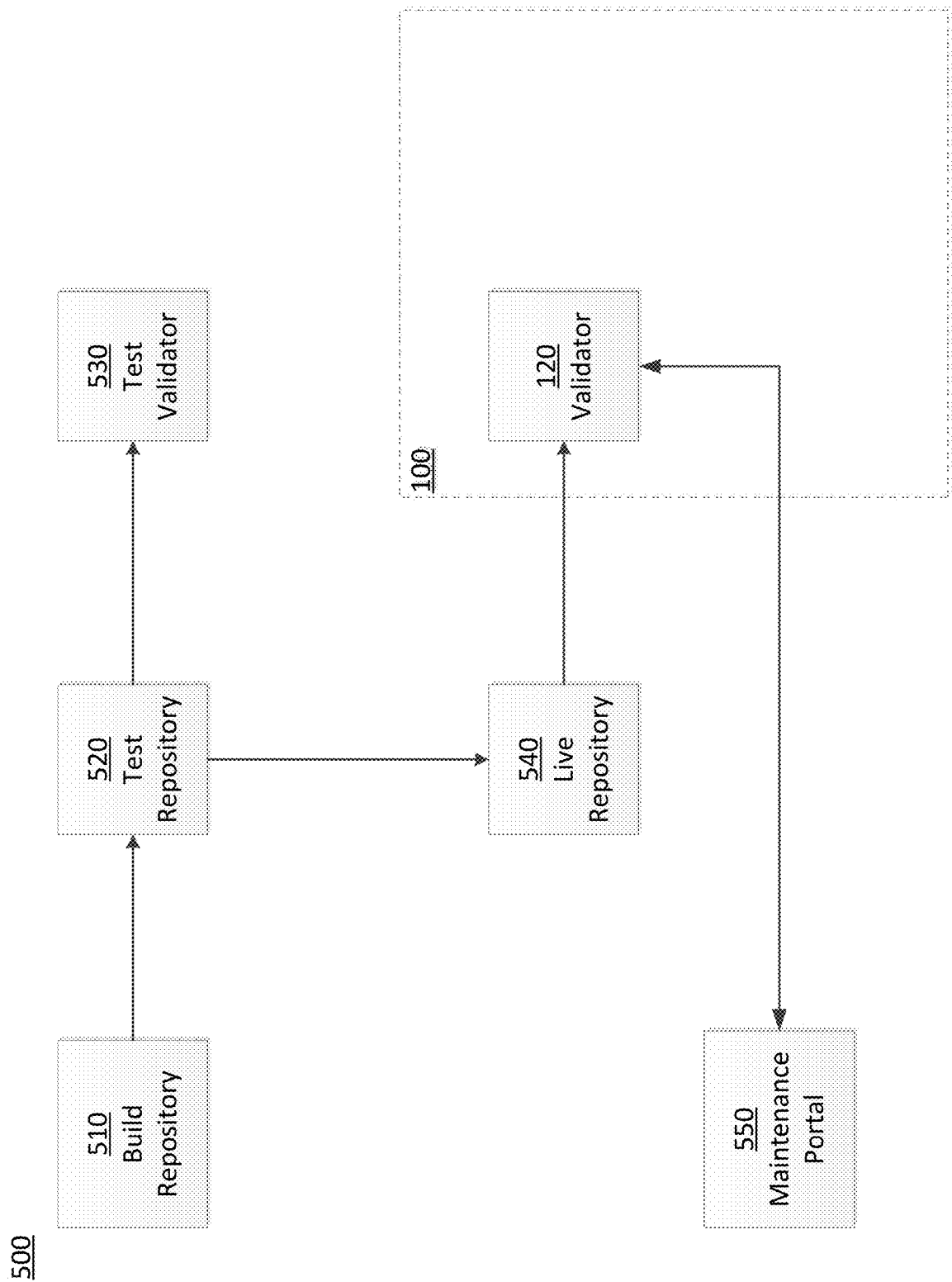
FIG. 5 illustrates a process for provisioning software to a validator in accordance with the disclosed embodiments.

FIG. 5 illustrates an example of a system 500 for provisioning new software on validator 120 of system 100. In addition to validator 120, system 500 includes a build repository 510, a test repository 520, a test validator 530, a live repository 540, and a maintenance portal 550.

Build repository 510 may include one or more builds of software for validator 120. For example, build repository 510 may include the latest build of software for validator 120. As shown in FIG. 5, build repository 510 may provide a build of software for validator 120 to test repository 520. The build of software may be transmitted or made available for retrieval.

In system 500, when a new build of software is obtained by test repository 520, test validator 530 may be configured update its software with the new build obtained by test repository 520. In some embodiments, test validator 530 may detect that new build is obtained by test repository 520. Alternatively, or additionally, test repository 520 may notify test validator 530 that a new build has been obtained and cause test validator 530 to update the software. In some embodiments, test validator 530 may update the software during an initialization stage (e.g., when test validator 530 is turned on or restarted).

After test validator 530 is updated with the new build of the software, test validator 530 may be tested. For example, test validator 530 may be tested with various known valid and invalid digital tickets and the validation results may be compared with the expected results. In another example, test validator 530 may be field tested.

After determining that the new build of the software is ready to be distributed to validator 120 in system 100, the new build may be provided to live repository 540. Similar to test validator 530, when a new build of software is obtained by live repository 540, validator 120 may be configured update its software with the new build obtained by live repository 540. In some embodiments, the new build may be provided by test repository. Alternatively, the new build may be provided by build repository 510. In some embodiments, validator 120 may detect that a new build is obtained by live repository 540. Alternatively, or additionally, live repository 540 may notify validator 120 that a new build has been obtained. In some embodiments, validator 120 may update the software during an initialization stage (e.g., when validator 120 is turned on or restarted).

Repositories 510, 520, and/or 540 may be implemented on one or more physical and/or virtual servers. In some embodiments, repositories 510, 520, and/or 540 may be implemented on a cloud platform. For example, repositories 510, 520, and/or 540 may be implemented on Amazon Web Services S3 platform.

Maintenance portal 550 may connect to validator 120 and cause validator 120 to execute custom processes and/or one or more of the predefined processes. Such processes may be maintenance related processes. For example, maintenance portal 550 may cause validator 120 to restart, execute a self-diagnostic process, and/or transmit a log to another entity. In some embodiments, maintenance portal 550 may connect to validator 120 using secure shell (SSH).

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A ticket validating device, comprising: one or more hardware processors configured to: obtain a digital ticket, a ticket-server signature, and a device signature from a ticket holder's device, wherein: the digital ticket (1) is associated with one or more products and/or services purchased and (2) is received from a ticket server by the ticket holder's device, the ticket-server signature is (1) generated based on the digital ticket using a private key associated with the ticket server and (2) received from the ticket server by the ticket holder's device, and the device signature is generated based on the digital ticket using a private key associated with the ticket holder's device, wherein the generation of the device signature is further based on device data from the ticket holder's device, and the device data includes a location of the ticket holder's device when the device signature is generated, wherein the device data further includes a timestamp representing when the ticket holder's device last synchronized with the ticket server, wherein the ticket holder's device, during the synchronization, is capable of at least one of: updating, removing, or marking as being revoked one or more digital tickets on the ticket holder's device, and the digital ticket, ticket-server signature, and device signature are encoded based in-part on at least one of time-dependent and location-dependent device data, and displayed as at least one of a barcode and QR code on a display in the ticket holder's device; validate the digital ticket, wherein the validation of the digital ticket includes: verifying, based on the timestamp, that the ticket holder's device last synchronized with the ticket server within a predetermined time period, verifying the ticket-server signature using a public key corresponding to the private key associated with the ticket server, and verifying the device signature using a public key corresponding to the private key associated with the ticket holder's device; and cause generation of an output based on a result of the validation of the digital ticket.

2. The ticket validating device of claim 1, wherein the validation of the digital ticket includes verifying that the digital ticket has not been previously validated by the ticket validating device.

3. The ticket validating device of claim 1, wherein the validation of the digital ticket includes verifying that the digital ticket has not been altered since it was signed by a ticket server.

4. The ticket validating device of claim 1, wherein the validation of the digital ticket includes determining that a current location of the ticket validating device is within a predetermined distance from the location of the ticket holder's device when the device signature is generated.

5. The ticket validating device of claim 1, wherein the device data includes a timestamp representing when the device signature is generated.

6. The ticket validating device of claim 5, wherein the validation of the digital ticket includes determining that a current time is within a predetermined amount of time from the timestamp.

7. The ticket validating device of claim 1, wherein the device signature is provided by ticket holder's device to the ticket validating device in response to completing generation of the device signature.

8. The ticket validating device of claim 1, wherein the obtaining of the digital ticket, the ticket-server signature, and the device signature includes obtaining and decoding a visual content displayed on the ticket holder's device.

9. A method for validating a digital ticket by a ticket validating device, the method comprising: obtaining a digital ticket, a ticket-server signature, and a device signature from a ticket holder's device, wherein: the digital ticket (1) is associated with one or more products and/or services purchased and (2) is received from a ticket server by the ticket holder's device, the ticket-server signature is (1) generated based on the digital ticket using a private key associated with the ticket server and (2) received from the ticket server by the ticket holder's device, and the device signature is generated based on the digital ticket using a private key associated with the ticket holder's device, wherein the generation of the device signature is further based on device data from the ticket holder's device, and the device data includes a location of the ticket holder's device when the device signature is generated, wherein the device data further includes a timestamp representing when the ticket holder's device last synchronized with the ticket server, wherein the ticket holder's device, during the synchronization, is capable of at least one of: updating, removing, or marking as being revoked one or more digital tickets on the ticket holder's device, and the digital ticket, ticket-server signature, and device signature are encoded based in-part on at least one of time-dependent and location-dependent device data, and displayed as at least one of a barcode and QR code on a display in the ticket holder's device; validating the digital ticket, wherein the validation of the digital ticket includes: verifying, based on the timestamp, that the ticket holder's device last synchronized with the ticket server within a predetermined time period, verifying the ticket-server signature using a public key corresponding to the private key associated with the ticket server, and verifying the device signature using a public key corresponding to the private key associated with the ticket holder's device; and causing generation of an output based on a result of the validation of the digital ticket.

10. The method of claim 9, wherein the validation of the digital ticket includes verifying that the digital ticket has not been previously validated by the ticket validating device.

11. The method of claim 9, wherein the validation of the digital ticket includes verifying that the digital ticket has not been altered since it was signed by a ticket server.

12. The method of claim 9, wherein the validation of the digital ticket includes determining that a current location of the ticket validating device is within a predetermined distance from the location of the ticket holder's device when the device signature is generated.

13. The method of claim 9, wherein the device data includes a timestamp representing when the device signature is generated.

14. The method of claim 13, wherein the validation of the digital ticket includes determining that a current time is within a predetermined amount of time from the timestamp.

15. The method of claim 9, wherein the device signature is provided by ticket holder's device to the ticket validating device in response to completing generation of the device signature.

16. The method of claim 9, wherein the obtaining of the digital ticket, the ticket-server signature, and the device signature includes obtaining and decoding a visual content displayed on the ticket holder's device.

17. A non-transitory computer-readable storage medium storing instructions that when executed by a computer cause the computer to perform a method for communicating with a device, the method comprising: obtaining a digital ticket, a ticket-server signature, and a device signature from a ticket holder's device, wherein: the digital ticket (1) is associated with one or more products and/or services purchased and (2) is received from a ticket server by the ticket holder's device, the ticket-server signature is (1) generated based on the digital ticket using a private key associated with the ticket server and (2) received from the ticket server by the ticket holder's device, and the device signature is generated based on the digital ticket using a private key associated with the ticket holder's device, wherein the generation of the device signature is further based on device data from the ticket holder's device, and the device data includes a location of the ticket holder's device when the device signature is generated, wherein the device data further includes a timestamp representing when the ticket holder's device last synchronized with the ticket server, wherein the ticket holder's device, during the synchronization, is capable of at least one of: updating, removing, or marking as being revoked one or more digital tickets on the ticket holder's device, and the digital ticket, ticket-server signature, and device signature are encoded based in-part on at least one of time-dependent and location-dependent device data, and displayed as at least one of a barcode and QR code on a display in the ticket holder's device; validating the digital ticket, wherein the validation of the digital ticket includes: verifying, based on the timestamp, that the ticket holder's device last synchronized with the ticket server within a predetermined time period, verifying the ticket-server signature using a public key corresponding to the private key associated with the ticket server, and verifying the device signature using a public key corresponding to the private key associated with the ticket holder's device; and causing generation of an output based on a result of the validation of the digital ticket.

* * * * *